(12) United States Patent  (10) Patent No.: US 7,457,203 B2
Nakagawa  (45) Date of Patent: Nov. 25, 2008

(54) TIMEPIECE AND TIME CORRECTION METHOD

(75) Inventor: Makoto Nakagawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/729,265

(22) Filed: Mar. 28, 2007

(65) Prior Publication Data

US 2007/0241959 A1    Oct. 18, 2007

(30) Foreign Application Priority Data

Mar. 31, 2006    (JP)    ............... 2006-099774

(51) Int. Cl.
  *G04C 11/02*    (2006.01)
  *G01S 5/14*     (2006.01)
(52) U.S. Cl. .................. 368/47; 342/357.06
(58) Field of Classification Search ........... 368/47; 342/357.06
   See application file for complete search history.

(56) References Cited

U.S. PATENT DOCUMENTS 6,750,814 B1 *  6/2004  Nir et al. ............ 342/357.06

2005/0135194 A1 *  6/2005  Ishii .................. 368/47

FOREIGN PATENT DOCUMENTS

JP    09-178870 A    7/1997

\* cited by examiner

*Primary Examiner*—Thomas H. Tarcza
*Assistant Examiner*—Fred H. Mull
(74) *Attorney, Agent, or Firm*—Frishauf, Holtz, Goodman & Chick, P.C.

(57) ABSTRACT

A timepiece comprises a reception subunit, a timekeeping unit that holds internal time data indicative of the current time, storage, and a CPU. The CPU determines whether the internal time data acquired from the timekeeping unit matches correction time data stored in storage, selects a GPS satellite represented by satellite identification data stored in the storage when the determination is affirmative, acquires GPS time data included in navigation data which in turn is included in a GPS signal obtained from the selected GPS satellite, corrects the internal time data based on the GPS time data, and stores the correction time data in correspondence to the satellite identification data representing that GPS satellite.

10 Claims, 10 Drawing Sheets

SUBFRAME 1

| WORD | BIT POSITION | NUMBER OF BITS | | CONTENT | SCALE | SIGN | UNIT |
|---|---|---|---|---|---|---|---|
| 1 | 1 | 22 | TLM | TELEMETRY WORD | | | |
| 2 | 31 | 22 | HOW | HANDOVER WORD | | | |
| 3 | 61 | 10 | WN | WEEK No. | 0 | | |
| | 73 | 4 | URA | DISTANCE MEASUREMENT ACCURACY | | | |
| | 77 | 6 | SVhealth | SATELLITE HEALTH STATE | | | |
| | 83 | 2 MSB | IODC | CLOCK INFORMATION No. | | | |
| 7 | 197 | 8 | TGD | GROUP DELAY | -31 | ○ | s |
| 8 | 211 | 8 LSB | IODC | CLOCK INFORMATION No. | | | |
| | 219 | 16 | toc | EPOCH TIME (CLOCK) | 4 | | s |
| 9 | 241 | 8 | af2 | CLOCK CORRECTION COEFFICIENT | -55 | ○ | s/s$^2$ |
| | 249 | 16 | af1 | CLOCK CORRECTION COEFFICIENT | -43 | ○ | s/s |
| 10 | 271 | 22 | af0 | CLOCK CORRECTION COEFFICIENT | -31 | ○ | s |

FIG. 6

| NAVIGATION DATA (ALMANAC) | | | | | | | |
|---|---|---|---|---|---|---|---|
| WORD | BIT POSITION | NUMBER OF BITS | | CONTENT | SCALE | SIGN | UNIT |
| 1 | 1 | 22 | TLM | TELEMETRY WORD | | | |
| 2 | 31 | 22 | HOW | HANDOVER WORD | | | |
| 3 | 63 | 6 | SV ID | SATELLITE No. | | | |
| | 69 | 16 | e | ECCENTRICITY | -21 | | |
| 4 | 91 | 8 | toa | EPOCH TIME (CLOCK) | 12 | | s |
| | 99 | 16 | δi | ORBITAL ANGLE OF INCLINATION | -19 | ○ | sc |
| 5 | 121 | 16 | Ω | CHANGE RATE OF Ω | -38 | ○ | sc/s |
| | 137 | 8 | SVhealth | SATELLITE HEALTH STATE | | | |
| 6 | 151 | 24 | √A | ORBITAL RADIUS | -11 | | m1/2 |
| 7 | 181 | 24 | Ω0 | RIGHT ASCENSION OF ASCENDING NODE (R. A. A. N) | -23 | ○ | sc |
| 8 | 211 | 24 | ω | ARGUMENT OF PERIGEE | -23 | ○ | sc |
| 9 | 241 | 24 | M0 | MEAN ANOMALY | -23 | ○ | sc |
| 10 | 271 | 8 MSB | af0 | CLOCK CORRECTION COEFFICIENT | | | |
| | 279 | 11 | af1 | CLOCK CORRECTION COEFFICIENT | -38 | ○ | s/s |
| | 290 | 3 LSB | af2 | CLOCK CORRECTION COEFFICIENT | -20 | ○ | s |

| NAVIGATION DATA (SUBFRAME 4, PAGE 18) | | | | | | | |
|---|---|---|---|---|---|---|---|
| WORD | BIT POSITION | NUMBER OF BITS | | CONTENT | SCALE | SIGN | UNIT |
| 1 | 1 | 22 | TLM | TELEMETRY WORD | | | |
| 2 | 31 | 22 | HOW | HANDOVER WORD | | | |
| 3 | 63 | 6 | SV ID | PAGE ID=56 | | | |
| | 69 | 8 | $\alpha_0$ | IONOSPHERE CORRECTION COEFFICIENT | −30 | ○ | s |
| | 77 | 8 | $\alpha_1$ | IONOSPHERE CORRECTION COEFFICIENT | −27 | ○ | s/sc |
| 4 | 91 | 8 | $\alpha_2$ | IONOSPHERE CORRECTION COEFFICIENT | −24 | ○ | s/sc$^2$ |
| | 99 | 8 | $\alpha_3$ | IONOSPHERE CORRECTION COEFFICIENT | −24 | ○ | s/sc$^3$ |
| | 107 | 8 | $\beta_0$ | IONOSPHERE CORRECTION COEFFICIENT | 11 | ○ | s |
| 5 | 121 | 8 | $\beta_1$ | IONOSPHERE CORRECTION COEFFICIENT | 14 | ○ | s/sc |
| | 129 | 8 | $\beta_2$ | IONOSPHERE CORRECTION COEFFICIENT | 16 | ○ | s/sc$^2$ |
| | 137 | 8 | $\beta_3$ | IONOSPHERE CORRECTION COEFFICIENT | 16 | ○ | s/sc$^3$ |
| 6 | 151 | 24 | $A_1$ | UTC PARAMETER | −50 | ○ | s |
| 7 | 181 | 24 MSB | $A_0$ | UTC PARAMETER | −30 | ○ | s |
| 8 | 211 | 8 LSB | | | | | |
| | 219 | 8 | $T_{ot}$ | EPOCH TIME (UTC) | 12 | | s |
| | 227 | 8 | $WN_t$ | | 0 | | weeks |
| 9 | 241 | 8 | $\Delta t_{LS}$ | CURRENT INTERCALARY SECOND | 0 | | s |
| | 249 | 8 | $WN_{LSF}$ | INTERCALARY SECOND UPDATING WEEK | 0 | | weeks |
| | 257 | 8 | DN | INTERCALARY SECOND UPDATING DATE | 0 | | days |
| 10 | 271 | 8 | $\Delta t_{LSF}$ | UPDATED INTERCALARY SECOND | 0 | | s |

TIMEPIECE AND TIME CORRECTION METHOD

BACKGROUND OF THE INVENTION

1. Field of the Invention

The present invention relates to timepieces and time correction methods.

2. Background Art

Conventional GPS (Global Positioning System) receivers locate their respective positions by receiving GPS signals from selected ones of many (for example, 28) GPS satellites. Each GPS signal includes a C/A (Coarse/Acquisition) code of a different numerical value, which in turn includes navigation data or messages. In the reception of the GPS signals, each receiver compares three or four desired selected C/A codes with those of GPS signals received simultaneously from the GPS satellites, thereby selecting the desired satellites. Then, the receiver locates its position based on the navigation data included in the GPS signals from the selected satellites and current time data that will be provided by a timekeeping unit provided in the receiver and that is hereinafter referred to as internal current-time data.

A technique is provided for correcting the internal current time of the GPS receiver using the time data included in the navigation data. A GPS receiver, for example disclosed in Published Unexamined Japanese Patent Application Hei 9-178870, receives GPS signals from a plurality of GPS satellites, locates the position thereof and corrects the internal current-time data.

This receiver requires to drive at least three reception channels simultaneously to receive corresponding GPS signals from the GPS satellites concerned, and hence consumes high power. In addition, there is a demand that the internal current-time data be corrected with high accuracy.

It is therefore an object of the present invention to reduce power consumed to correct the internal current-time using the GPS signals and to correct the internal current time with high accuracy. To this end, it is an object of the present invention to correct the internal current time by receiving GPS time data from the same GPS satellite from which the GPS time data was received in the previous time correction in the same range of time from which the GPS time data was received in the previous time correction.

SUMMARY OF THE INVENTION

The foregoing and other objects are attained by a timepiece and time correction method according to the present invention. In the timepiece and method according to the present invention, one of a plurality of items of navigation data each included in a respective one of GPS signals transmitted by a like number of GPS satellites is received. Then, identification information indicative of the GPS satellite, from which the navigation data was received previously, is stored in storage in corresponding relationship to correction time data. Then, internal current-time data is acquired from a timekeeping unit provided in the timepiece and it is determined whether the acquired internal time data matches the correction time data stored in the storage. Then, responsive to the determining that the acquired internal current-time data matches, the GPS satellite is selected which is represented by the identification information stored in the storage in corresponding relationship to the correction time data. Then, the navigation data from the selected GPS satellite is received, and GPS time data included in the navigation data is acquired. Then, the internal current-time data is corrected based on the acquired GPS time data. Then, the identification information indicative of the GPS satellite, from which the navigation data was received, is then stored in the storage in correspondence to the correction time data.

It is a feature of the invention that the correction time data involves predetermined time data and that it is automatically determined whether the acquired internal current time data matches the correction time data stored in the storage.

It is another feature of the invention that, responsive to a time correction command, internal current-time data is acquired from the timekeeping unit and it is determined whether the acquired internal time data matches the correction time data stored in the storage.

It is still another feature of the invention that it is determined whether the internal current time is within a predetermined period of time after a correction time indicated by that correction time data stored in the storage, and that, responsive to the determining that the internal time is within the predetermined period of time after the correction time, it is determined whether the internal time data matches the correction time data.

It is yet another feature of the invention that correcting data is calculated based on an intercalary second, the acquired GPS time data, the distance between the timepiece and the GPS satellite from which the navigation data was received, and a time required from the acquisition of the GPS signal to correction of the internal current time data, and then the internal current time data is corrected with the correcting data.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE EMBODIMENT

Referring to FIGS. 1-9, a timepiece 100 of this embodiment comprises a body 10 and a reception unit 20. The body 10 comprises a CPU 11, a control unit 12, a RAM 13, a display 14, storage 15, a ROM 16, and a timekeeping unit 17.

Figure 1:
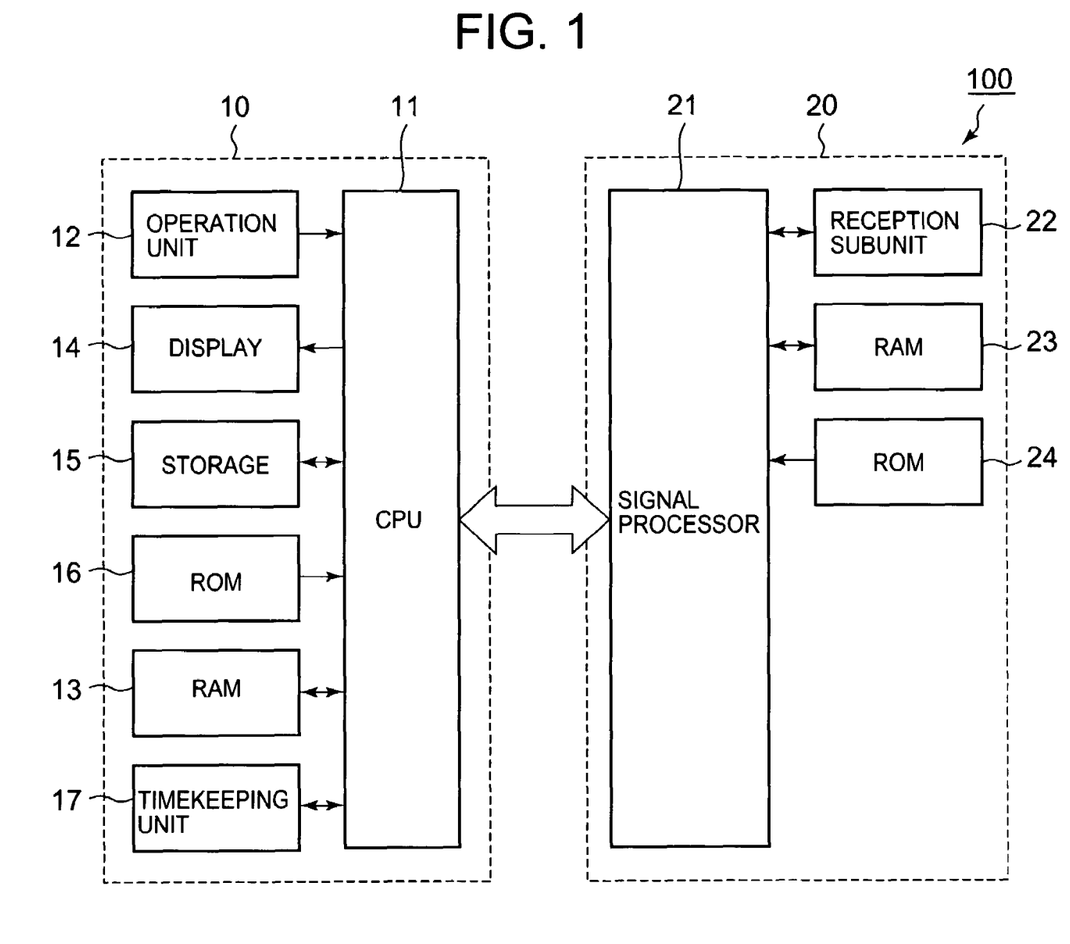
FIG. 1 is a block diagram of a timepiece as an embodiment of the present invention.

CPU 11 loads on RAM 13 a system program and a selected one of various application programs stored in ROM 16 and executes corresponding processing in accordance with the application program.

CPU 11 determines whether internal current-time data acquired from the timekeeping unit 17 is in a range of time corresponding to correction time data stored in storage 15. If so, CPU 11 selects a visible satellite with identification information indicative of a satellite number stored in corresponding relationship to the correction time data in storage 15, acquires HOW data indicative of a GPS time included in a GPS signal received from the selected GPS satellite through reception subunit 22, corrects the internal current-time data based on the GPS time data, and stores in storage 15 the number of the GPS satellite, from which the GPS signal was received in the correction of the internal current-time data, as corresponding to the correction time data.

Operation unit 12 includes various keys that cause the timepiece 10 to perform its own functions. When any one of the keys is operated, a corresponding operation signal is outputted to CPU 11.

Figure 2A:
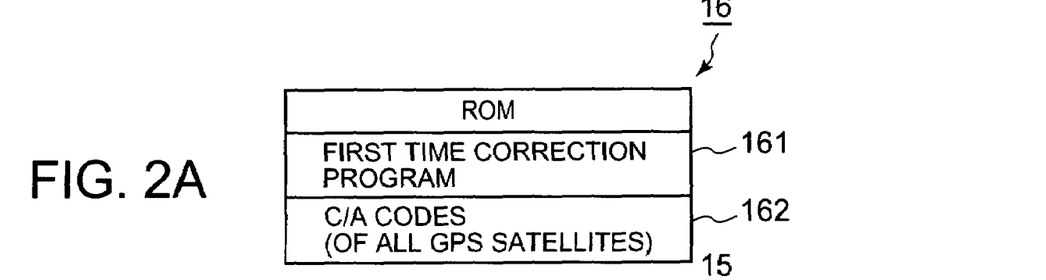
FIGS. 2A, 2B and 2C show a ROM 16, storage 15 and a RAM 13, respectively, of the timepiece of FIG. 1.

RAM 13 comprises a volatile memory that stores various information and that has working areas in which various programs and data are loaded. As shown in FIG. 2C, RAM 13 comprises data storage areas 131-134, and a program area 135. In a first time correction process to be described later, data area 131 stores visible satellite numbers ID-m, ..., ID-p selected from among all satellite numbers ID-1 to ID-n. Data area 132 stores one selected visible satellite number ID-r. Data area 133 stores data on the distance between time piece 100 and a GPS satellite from which the GPS signal is to be received. Data area 134 stores data with which the internal current-time data should be corrected. Program area 135 is the one on which the first time correction program is loaded.

Display 14 is composed of a LCD or an ELD (ElectroLuminescent Display) and displays various items of information based on corresponding data received from CPU 11. Display 14 digitally displays the current time provided by timekeeping unit 17.

Storage 15 comprises a flash memory or EEPROM (Electrically Erasable Programmable ROM) that stores information readably.

Figure 2B:
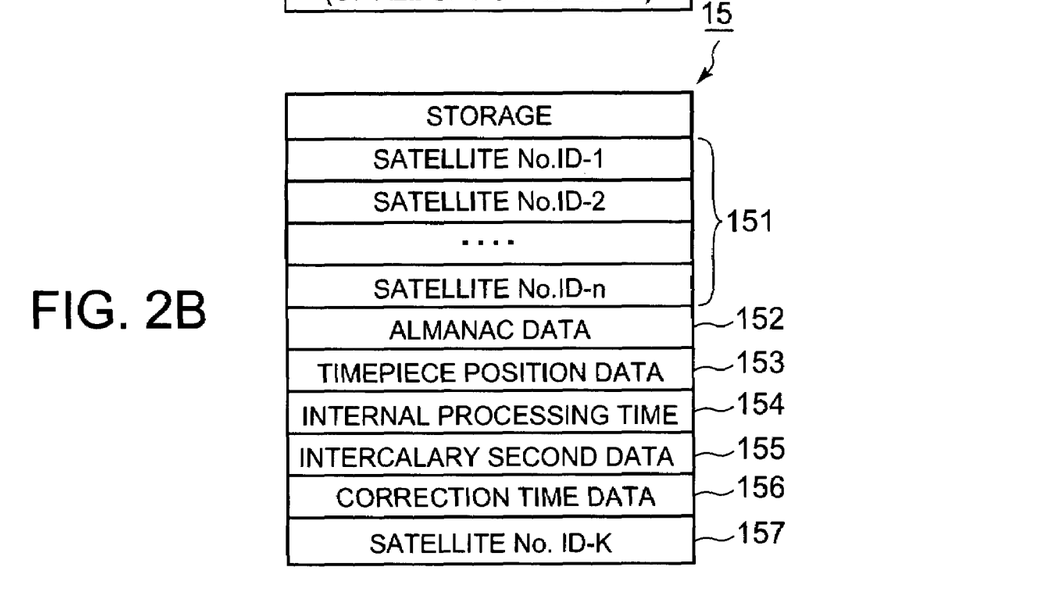
Figure 2C:
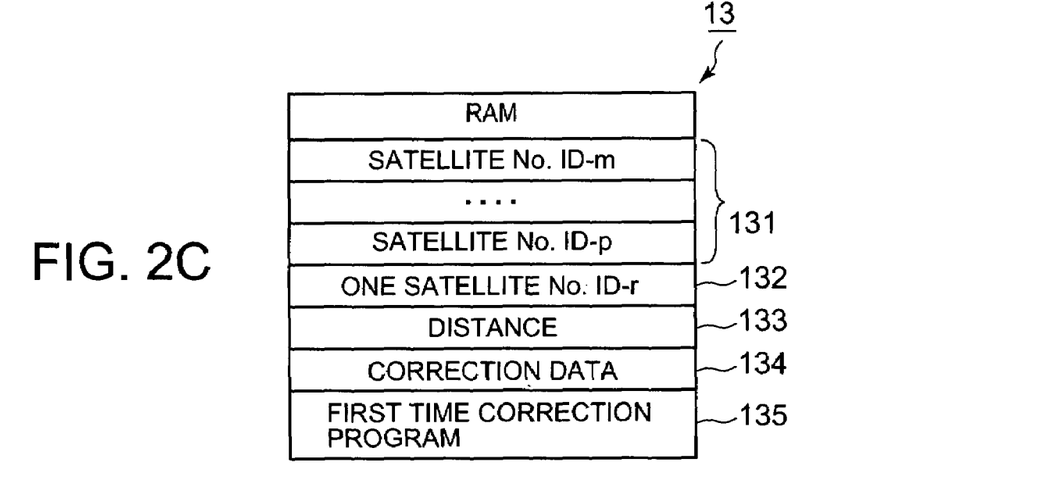

As shown in FIG. 2B, storage 15 comprises data storage areas 151-157. Data area 151 has stored identification numbers ID-1 to ID-n of all the GPS satellites. Data area 152 has stored almanac data to be described later. Data area 153 has stored data on the position of timepiece 100. Data area 154 has stored an internal processing time to be described below. Data area 155 has stored intercalary second data to be described later. Data area 156 has stored correction time data in the time correction. Data area 157 has stored the number JD-k of the satellite concerned, where k=1, 2, 3, ..., n, from which satellite the GPS signal was received in the time correction.

Data on the position of timepiece 100 is manually inputted at the operation unit 12 and stored in storage 15. The timepiece position data may include data on the height of timepiece 100. The internal processing time is preset in timepiece 100 and includes a period of time required from the acquisition of the GPS signals to correction of the internal current-time data.

Each satellite number in storage 15 identifies the GPS satellite from which the HOW data was received in the previous time correction. The correction time data and the satellite number are updated each time the internal current time is corrected. They are first inputted at operation unit 12 by the user and stored in storage 15.

As shown in FIG. 2A, ROM 16 comprises a program area 161 where the first time correction program is stored and a data area 162 where C/A codes of all the GPS satellites are stored.

Timekeeping unit 17 counts clock pulse signals generated by an oscillator (not shown), holds hourly changing internal current-time data and outputs it to CPU 11. Timekeeping unit 17 corrects the internal current-time data based on a time correction command given by CPU 11.

Reception unit 20 comprises a signal processor (or CPU) 21, reception subunit 22, RAM 23, and ROM 24.

Signal processor 21 includes a DSP (Digital Signal Processor) that demodulates navigation data from a GPS signal received by reception subunit 22 and transfers it to CPU 11.

Reception subunit 22 comprises an antenna, amplifier and mixer (none of which is shown). Reception subunit 22 receives a GPS signal through the antenna, amplifies this signal, converts the GPS signal to a signal of an intermediate frequency band sufficiently lower than the carrier wave concerned and performs a tuning operation concerned. Reception subunit 22 comprises a single channel capable of receiving a GPS signal from one GPS satellite.

Signal processor 21 loads on RAM 23 a program selected from the system program and the various application programs stored in ROM 24 and executes corresponding processing in accordance with the loaded program.

For example, signal processor 21 demodulates navigation data in accordance with a navigation data demodulation program read from ROM 24 and loaded on RAM 23 in response to reception of a GPS signal by reception subunit 22. Signal processor 21 phase synchronizes any C/A code inputted by CPU 11 from ROM 16 with a C/A code of a GPS signal received from the GPS satellite by reception subunit 22, and then demodulates the navigation data in a despreading manner.

Figure 3A:
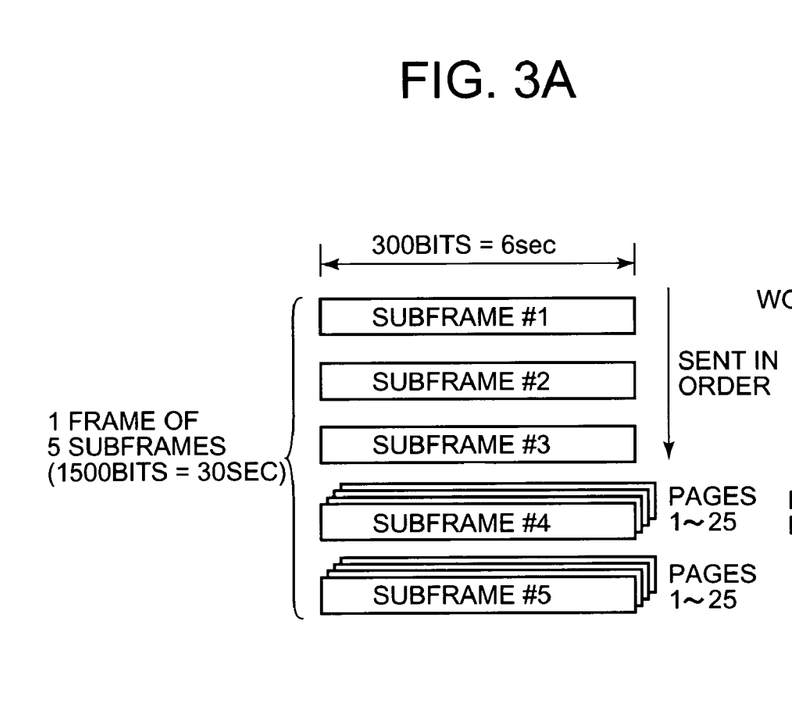
FIGS. 3A and 3B show a frame of navigation data, and one of subframes composing the frame, respectively.
Figure 3B:
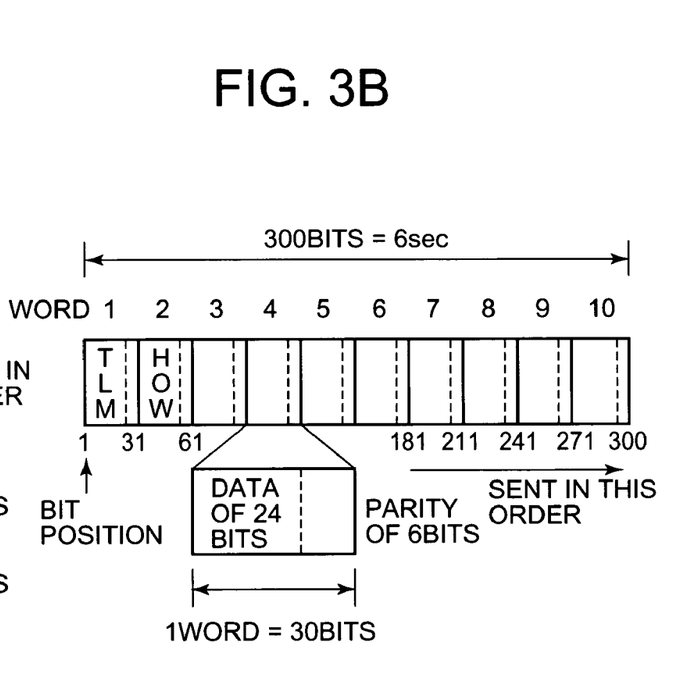
Figure 4:
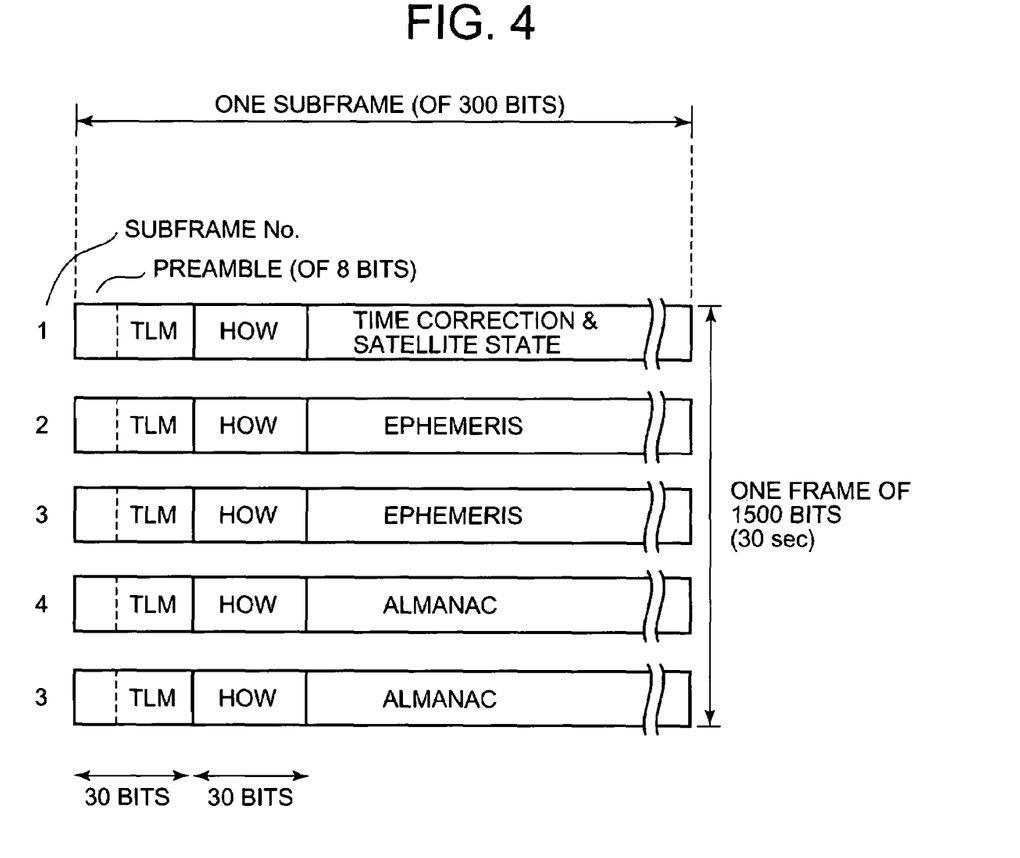
FIG. 4 illustrates respective subframes composing a frame.

Referring to FIGS. 3 and 4, a GPS system will be outlined. Elements of the whole GPS system present in a space, those of the whole GPS system present on ground, and a user's receiver are called space, control and user segments, respectively. The GPS satellites belong to the space segments. The GPS satellites are not geostationary ones, but circles at a height of 20 km, changing the position thereof hourly relative to the earth. The space and control segments are developed and managed by the US forces. The user segment shall be designed and made by the user. Thus, the specifications of signals which will be sent by the GPS satellites are prescribed in detail and a document indicative of the specifications, called Interface Control Document (ICD), is published. This document runs into several impressions, one of which is, for example, GPS-ICD-200.

At present, 28 GPS satellites are running while sending radio GPS signals the basic frequency of which is 1.575.42 MHz (called L1 waves on which a signal called a C/A code for commercial use is born.)

FIGS. 3A and 3B show a frame indicative of one cycle of navigation data and a subframe of the navigation data, respectively. The navigation data of a format of FIGS. 3A and 3B described in C/A codes is sent at 50 bps from each GPS satellite. The navigation data comprises information on the orbit of the satellite and the current time.

One cycle or frame of the navigation data is composed of 1500 bits. In order to send one frame from a GPS satellite, 30 seconds are required. A frame is composed of 5 subframes of 300 bits, which are sent sequentially starting with a subframe #1. When the last subframe #5 has been sent, this sending operation is repeated.

As shown in FIG. 4, subframes #1-#3 of the frame comprise clock correction information and orbit information (ephemeris) of the GPS satellite concerned. The contents of the remaining subframes #4 and #5 sent by all the satellites are identical and comprise rough orbit information (almanac) of all the satellites, the maximum number of which is 32, and ionosphere correction information. However, the information amounts of the subframes #4 and #5 are large and hence each of these subframes has 25 pages, which are sent sequentially. Twenty-five frames are required to send the content of all the pages, and 12 minutes and 30 seconds are required to obtain all the information of the navigation data.

Each subframe is divided into 10 words of 30 bits as shown in FIGS. 3B and 4. Each word is composed of a data section of 24 bits and a parity check section of 6 bits. Each subframe has at its head a TLM (TeLeMetry) word including a synchronous pattern accompanied by a HOW (HandOver Word) including time information of a GPS signal concerned.

A time whose information is included in the GPS signal is managed in units of one week. Each week starts at 0 o'clock of Sunday thereof (or 24 o'clock of Saturday thereof) and a current time is expressed as an elapsed time TOW (Time Of Week) from the starting time thereof. The HOW includes a plurality of numbers each indicative of an elapsed time expressed in units of 1.5 seconds to allow the receiver to know the current time. Each week has a WN (Week Number) and the week starting at 00:00:00, Jan. 6, 1980 has WN 0. Thus, each time one week elapses, WN is incremented by one. For example, the WN of a week starting on Oct. 10, 2004 is 1292.

Five subframes have allotted navigation data. Only a part of the data will be described next because its details can be easily understood from GPS-ICD-200.

Figure 5:
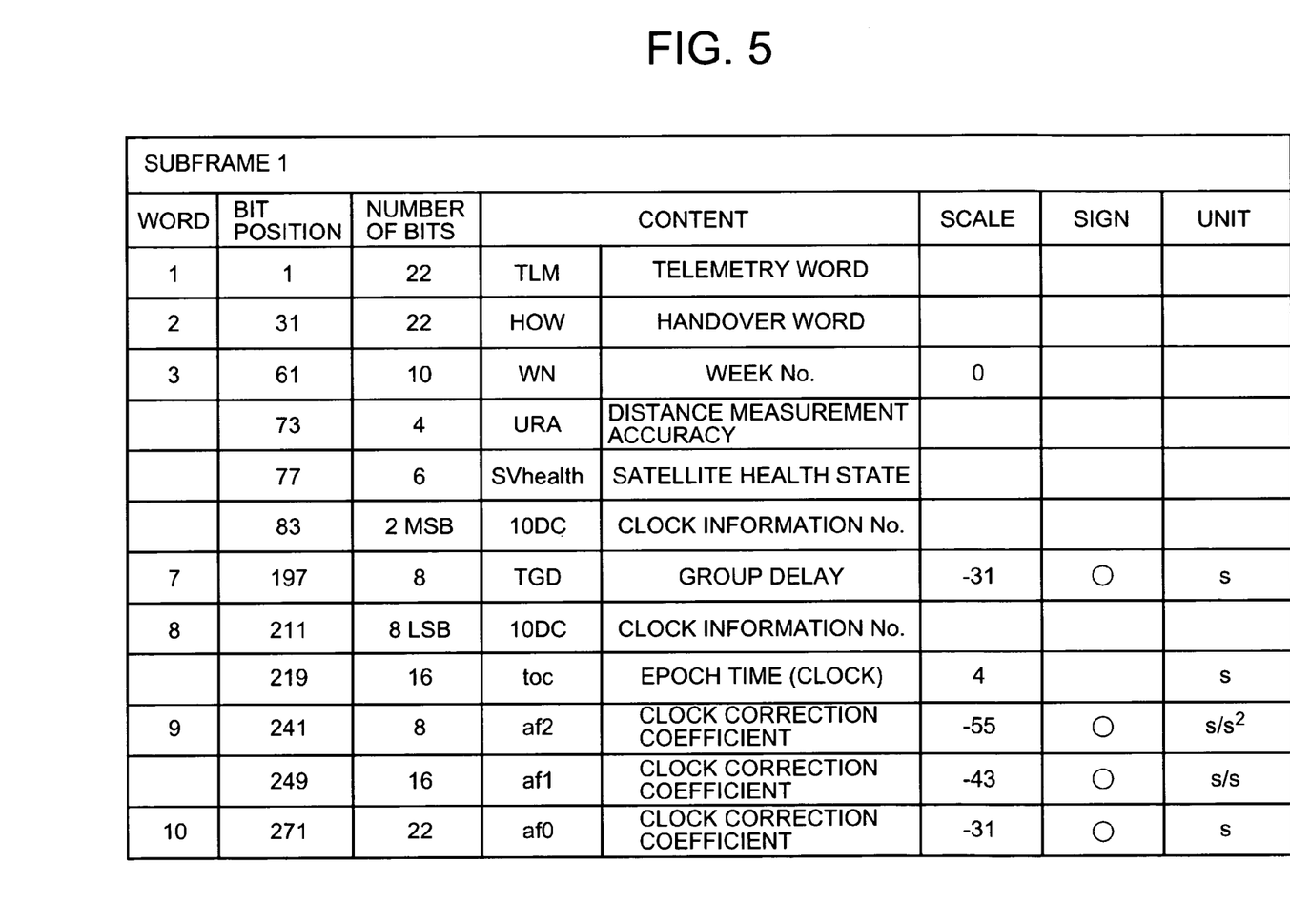
FIG. 5 illustrates the content of a subframe.

Subframe 1 shown in FIG. 5 includes a numerical value indicative of the state of a GPS satellite which is sending navigation data and clock correction coefficients. As shown in FIG. 5, each subframe includes words TLM, HOW, WN, URA, and S Vhealth arranged in this order.

The URA represents an accuracy with which a pseudodistance representing the distance between the receiver and a GPS satellite of interest including an error due to gaining of the timepiece 100 was measured. When URA is 15, this numerical value indicates that there is some abnormality. S Vhealth indicates a state of the satellite, and when it is other than 0, it indicates that there is some abnormality.

Subframes 2 and 3 include orbit information on the respective satellites, the details of which are shown in GPS-ICD-200. These items of orbit information are called ephemeris with which the position of a GPS satellite of interest at any time can be calculated.

Almanac data indicative of rough orbit information on all the GPS satellites is stored in pages 2-5 and 7-10 of subframe 4 and in pages 1-24 of subframe 5, the sum of which pages is 32 which correspond to 32 GPS satellites. The almanac data is stored in storage 15 of timepiece 100 and updated with that received once in several months.

Figure 6:
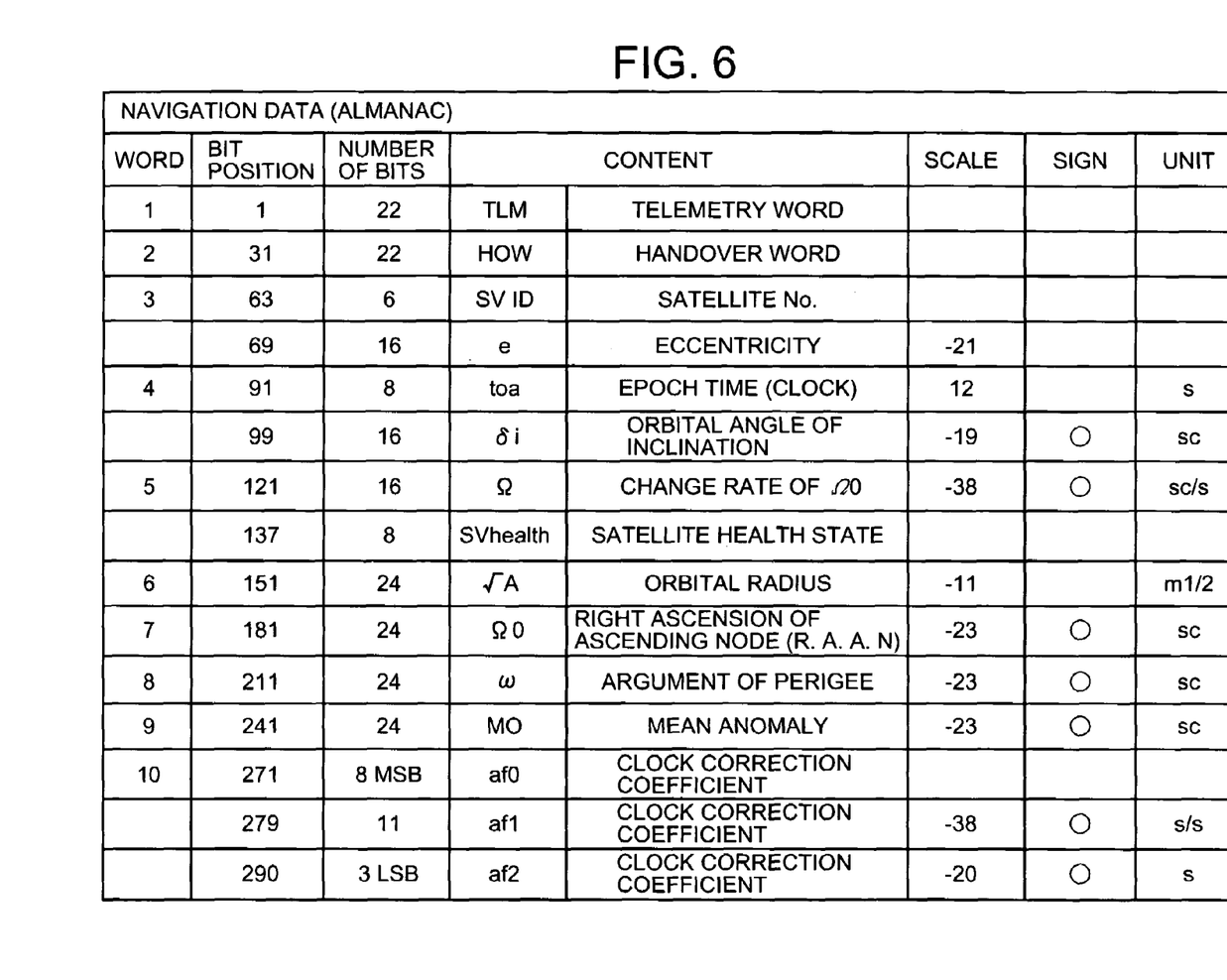
FIG. 6 illustrates the content of a subframe including almanac data.

The content of a subframe including almanac data is shown in FIG. 6. As shown, the head of the subframe includes a TLM word accompanied by a HOW word.

Figure 7:
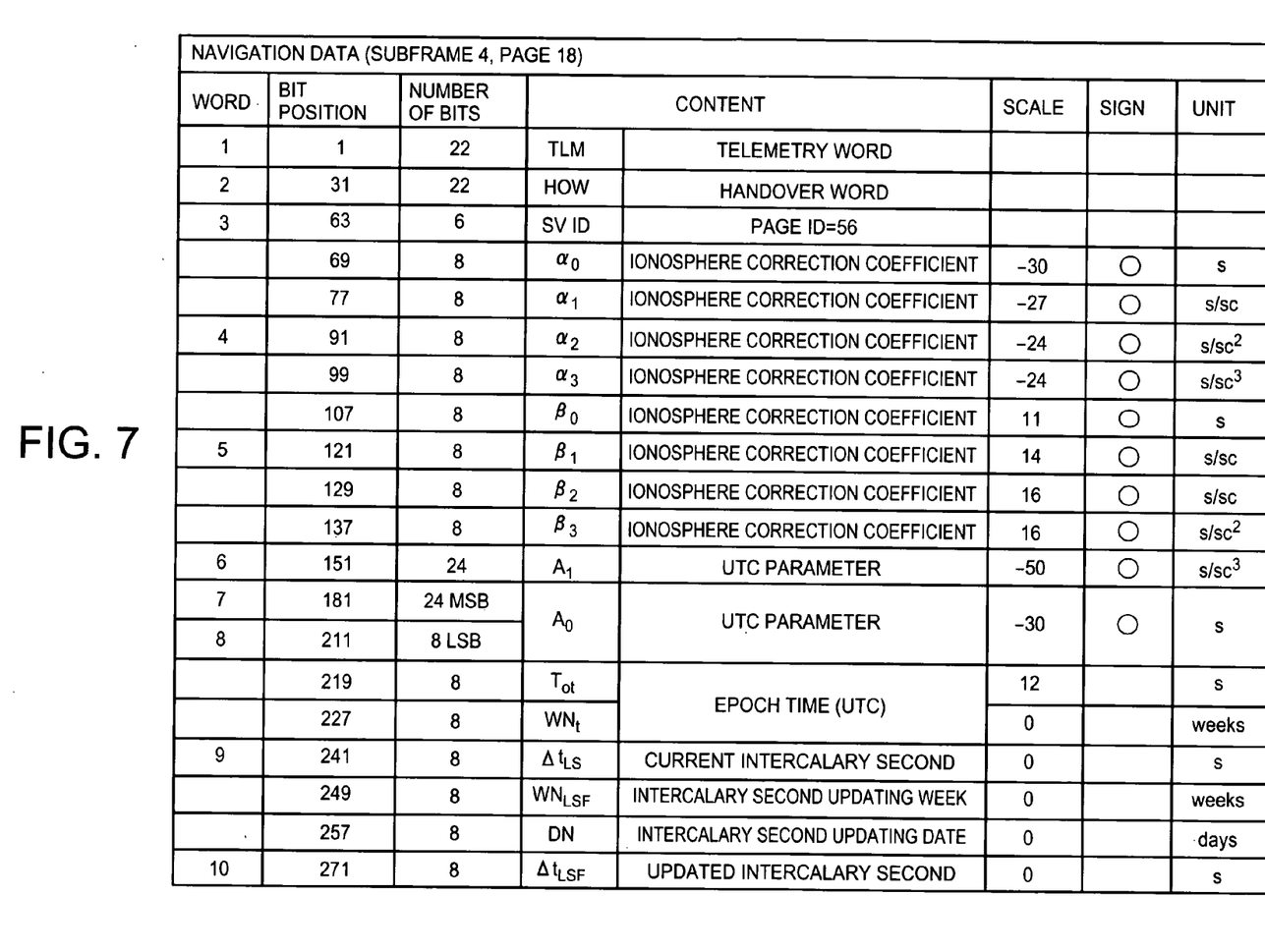
FIG. 7 illustrates the content of a specified page of a specified subframe.

The ionospheres distributed at a distance of 100 km from the earth act to delay radio waves. Information to correct the delay of the radio waves is stored in page 18 of subframe 4. FIG. 7 shows the content of page 18 of subframe 4 also with the head of a TLM word accompanied by a HOW word. Page 18 of subframe 4 includes a current intercalary second, $\Delta t_{LS}$, which is stored in storage 15 of timepiece 100 and updated with a received next intercalary second.

Figure 8:
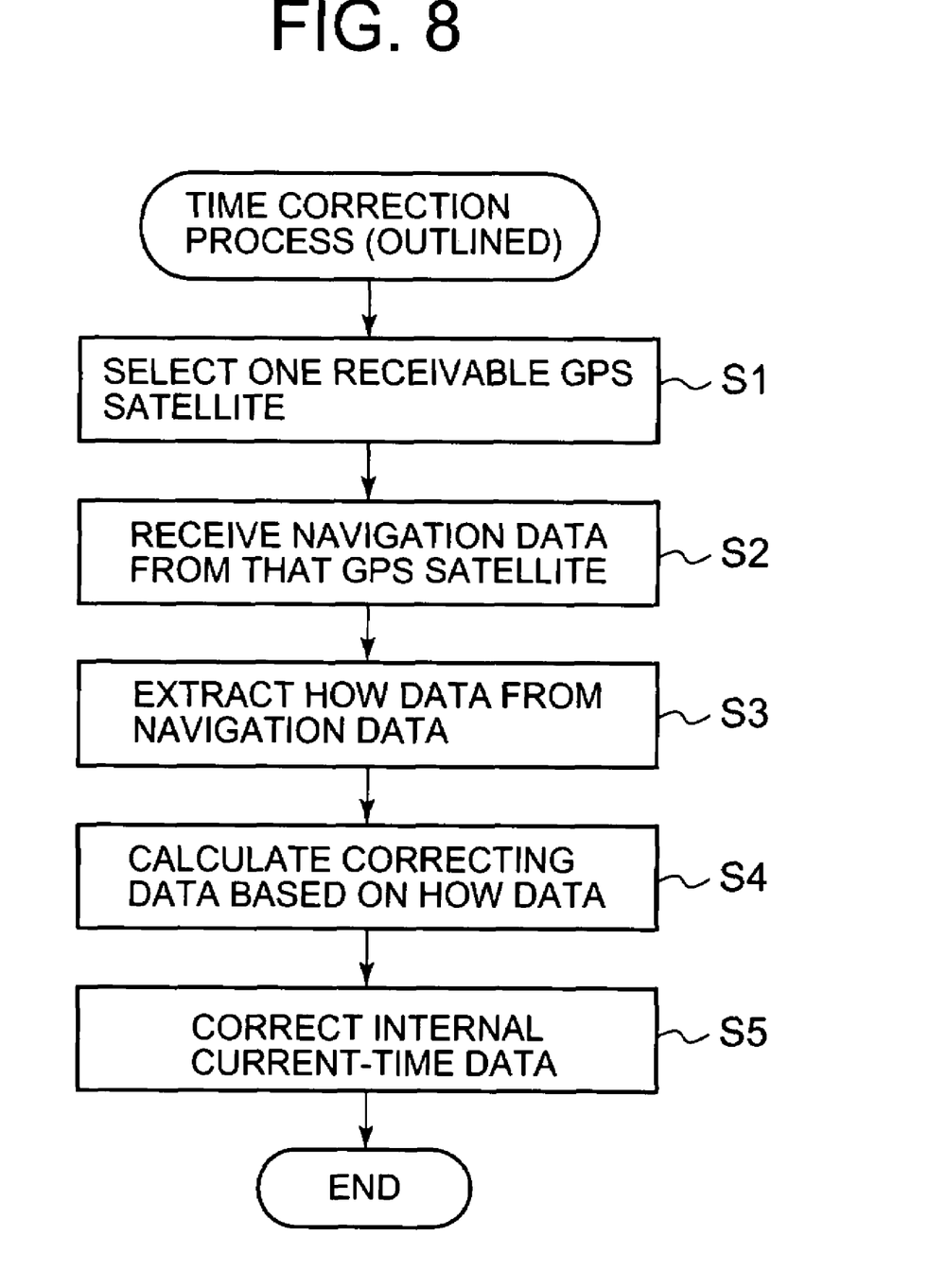
FIG. 8 is a flowchart giving an outline of a time correction process.

Referring to FIG. 8, the time correction process to be performed in timepiece 100 will be outlined, which process shall be executed in accordance with a time correction program by CPU 11 of timepiece 100. First, one GPS satellite whose GPS signal is receivable is selected in timepiece 100 (step S1). Then, navigation data included in the GPS signal is received by reception unit 20 (step S2).

HOW data is then extracted from the navigation data (step S3), and correcting data for the internal current-time data is calculated based on the HOW data, etc (step S4). Then, the internal current-time data provided by timekeeping unit 17 is corrected based on the correcting data (step S5), thereby terminating the time correction process.

Figure 9:
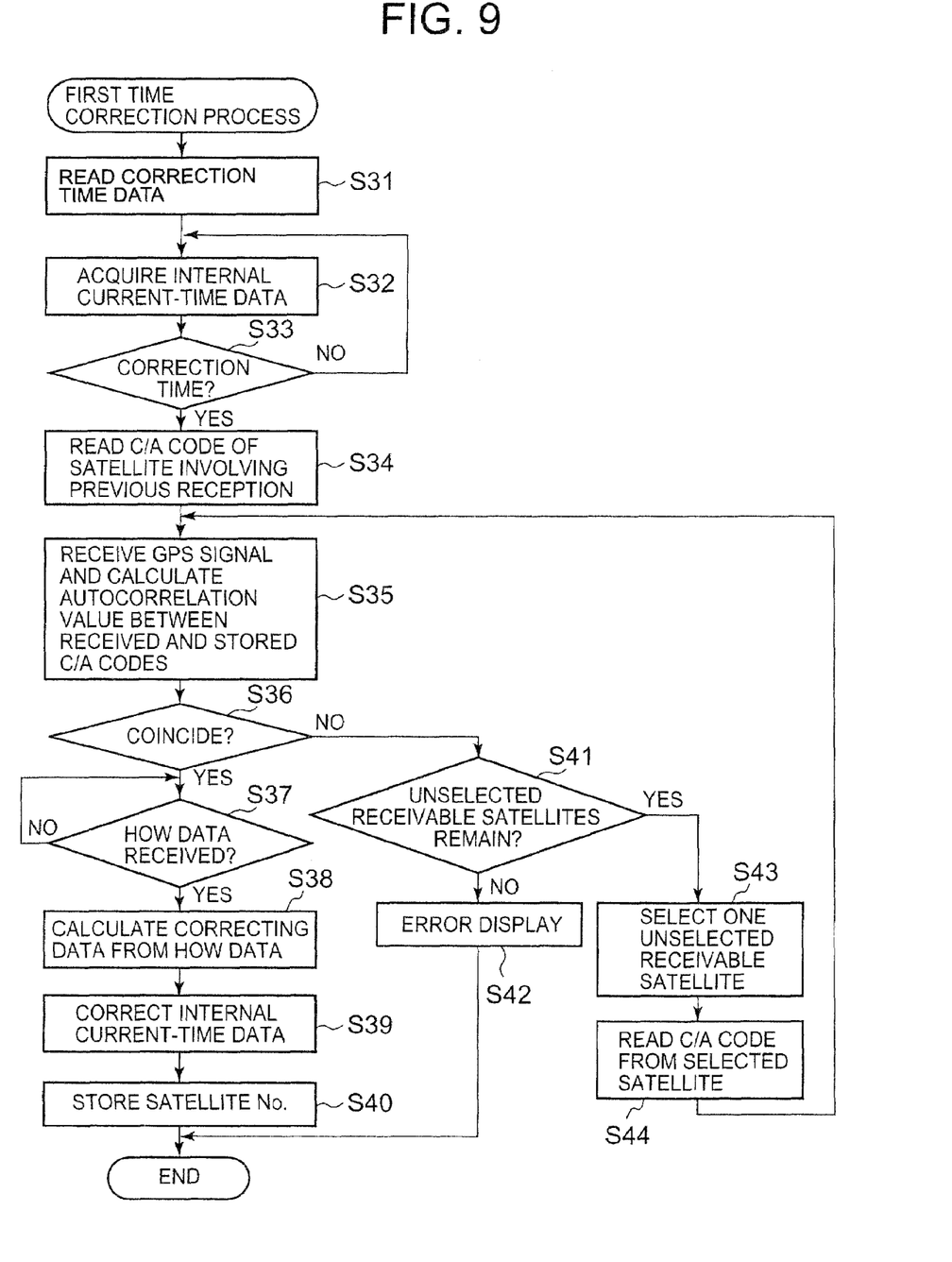
FIG. 9 is a flowchart indicative of a first time correction process.

Referring to FIG. 9, a first time correction process as one form of the FIG. 8 time correction process will be described. This process is repeated in a cycle, for example, of one day or half day. When a time at which the internal current time should be corrected comes in timepiece 100, CPU 11 reads a first time correction program from ROM 16, loads it on RAM 13 and then executes the program.

More particularly, as shown in FIG. 9, CPU 11 reads correction time data and a satellite number from storage 15 (step S31), and stores the satellite number as such in RAM 13. CPU 11 then acquires the internal current-time data from timekeeping unit 17 (step S32).

Then, CPU 11 determines whether the acquired internal current-time data matches the correction time data read in step S31 (step S33). If not, CPU 11 goes to step S32. If so, CPU 11 reads from ROM 16 the C/A code of a GPS satellite having the number read in step S31 or S44 (step S34).

Then, CPU 11 calculates an autocorrelation value between the C/A code read in step S34 and that of the GPS signal received by the reception subunit 22 (step S35).

Then, CPU 11 determines whether the two C/A codes coincide based on the autocorrelation value (step S36). If so, CPU 11 determines whether HOW data is acquired from the navigation data of the GPS signal of the selected GPS satellite (step S37). If not, CPU 11 returns to step S37.

If so in step S37, CPU 11 reads almanac data, timepiece position data, internal processing time and intercalary second data from storage 15 and also internal current-time data from timekeeping unit 17. Then, CPU 11 calculates position data on the GPS satellite under reception based on these read data. CPU 11 calculates the distance between the timepiece 100 and the GPS satellite under reception based on the position data on the GPS satellite and the position data on the timepiece. In addition, CPU 11 calculates amounts of correction to the internal current-time data corresponding to the respective HOW data received in step S37, distance data, internal processing time data and intercalary second data (step S38). The amount of correction to the distance between the timepiece and the GPS satellite is approximately 70 ms. The amount of correction to the internal processing time of timepiece 100 is approximately 30 ms. The amount of correction corresponding to the intercalary second is 14 s. The sum of these amounts of correction is approximately 14.1 s.

CPU 11 then corrects the internal current-time data of timepiece 17 by the correction quantity calculated in step S38 (step S39). Then, CPU 11 overwrites storage 15 with the number of the GPS satellite from which the GPS signal used for the time correction was received (step S40) and then terminates the first time correction process.

If not (NO in step S36), CPU 11 determines whether there remain unselected GPS satellites from which the GPS signals are receivable (step S41). More specifically, in step S41 CPU 11 reads almanac data and timepiece position data from storage 15 and acquires internal current-time data from timepiece 17. Then, CPU 11 calculates the current position data of all the GPS satellites based on the almanac data and the internal current-time data. CPU 11 predicts visible satellite candidates based on the timepiece position data and the current position data of all the GPS satellites. Then, CPU 11 determines based on these predicted satellite candidates whether there remain unselected GPS satellites among the visible satellite candidates. The timepiece position data may be inputted manually at the operation unit 12. The GPS satellite corresponding to the correction time data should be already selected.

When there remain no unselected GPS satellites (NO in step S41), CPU 11 displays an error message concerning the time correction on display 14 (step S42) and terminates the first time correction process.

When there remain unselected GPS satellites (YES in step S41), CPU 11 selects one from the unselected visible satellite candidates (step S43). An unselected satellite candidate is preferably selected which has a maximum one of the angles of elevation of the satellites calculated based on the position of the timepiece and the current positions of the satellite candidates found in step S41. Then, CPU 11 reads from ROM 16 a C/A code corresponding to the GPS satellite selected in step S43 (step S44) and then goes to step S35.

According to this embodiment, a GPS satellite is selected and HOW data included in a GPS signal thereof is received and acquired. Thus, the internal time data is corrected with the HOW data, thereby reducing the power consumption required for this time correction, and the GPS satellite from which the navigation data was received in the previous time correction is selected at a predetermined time and the HOW data is received from the GPS signal and used. Therefore, the internal time is corrected easily with high accuracy by the HOW data.

The internal time is corrected with high accuracy by correcting data calculated based on the HOW data, the distance between the received GPS satellite and timepiece 100, the internal processing time and the intercalary second.

(Modification)

Figure 10:
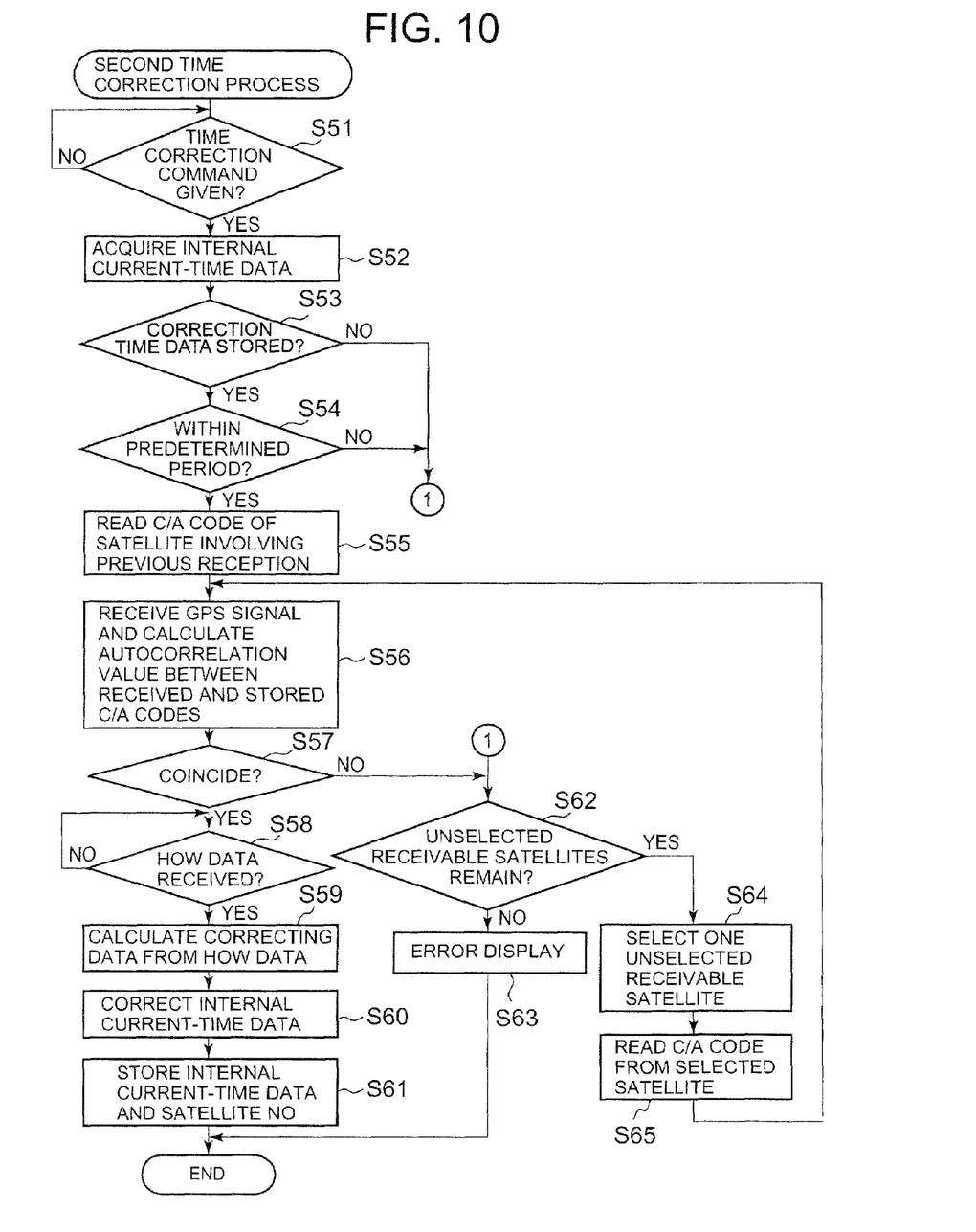
FIG. 10 is a flowchart indicative of a second time correction process.

Referring to FIG. 10, a modification of the embodiment will be described mainly with reference to a difference in structure and operation between the embodiment and the modification.

ROM 16 has stored a second time correction program instead of the first time correction program. The correction time data stored in data area 156 of storage 15 is updatable. In the time correction, the correction time data and the satellite number concerned stored in storage 15 shall be updated.

Referring to FIG. 10, operation of this modification will be described. When a command to execute a second time correction process is given through operation unit 12 of timepiece 100, CPU 11 reads a corresponding second time correction program from ROM 16, loads it on RAM 13 and then executes the second time correction program.

First, CPU 11 determines whether a time correction command is inputted at operation unit 12 (step S51). If not, CPU 11 goes to step S51. If so, CPU 11 acquires internal time data from timekeeping unit 17 (step S52).

Then, CPU 11 determines whether correction time data matching the internal current time data, for example ±30 minutes, acquired in step S52 and a corresponding satellite number are stored in storage 15 (step S53). If not, CPU 11 goes to step S62.

If so, CPU 11 reads the correction time data and the satellite number, and then determines whether an elapsed time from a time indicated by the read correction time data to a time indicated by the internal current-time data acquired in step S52 is within a predetermined period of time, for example, one month (step S54).

Since each GPS satellite circles in a cycle of approximately 12 hours, and hence is presumed to pass the same position at the same time in every day. Strictly speaking, each GPS satellite circles in a cycle of approximately 11 hours and 58 minutes. Thus, the position of the same GPS satellite that is observed at the same time every day as days pass deviates from the position which the satellite was observed previously. When a predetermined time or more has elapsed from the previous time correction, the GPS satellite shall not be selected using the correction time data because the deviation of the GPS satellite position is large.

If not (NO in step S54), CPU 11 goes to step S62. Steps S55-S65 of FIG. 10 correspond to steps S34-S44, respectively, of the FIG. 9 first time correction process.

According to this modification, the power consumption required for the internal time correction is reduced as in the embodiment. In addition, in accordance with the correction command the GPS satellite from which the GPS signal was received in the previous time correction is selected, and the GPS signal and hence HOW data are acquired. Thus, the internal current time is corrected with high accuracy by the HOW data.

When the internal current time is within the predetermined period of time after the previous time correction, the same GPS satellite from which the GPS signal was received in the previous time correction is selected at substantially the same position as in the previous time correction and HOW data included in the GPS signal is acquired at the same time as in the previous time correction. Thus, the internal time is corrected with high accuracy by the HOW data While in timepiece 100 reception subunit 22 is illustrated as having a single reception channel without measuring the position of the timepiece using the GPS signal, the reception subunit 22 may have a plurality of reception channels, three or more of which may be driven simultaneously to locate the position of the timepiece 100. When the internal current time is corrected also in this case, only one reception channel is required to be driven, which reduces power consumption compared to the case in which the plurality of channels are driven. Arrangement may be such that the timepiece is incorporated into a GPS receiver that locates its position.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

SUMMARY OF THE EMBODIMENT AND MODIFICATION)

The embodiment and modification of the present invention are summarized as follows:

(1) A timepiece comprises:

a reception unit (for example, 22 in FIG. 1; step S2 in FIG. 8; step S3 in FIG. 9, step S56 in FIG. 10) that receives one of a plurality of items of navigation data each included in a respective one of GPS signals transmitted by a like number of GPS satellites;

a timekeeping unit (for example, 17 in FIG. 1) that provides a current time and holds it as internal current time data;

storage (for example, 15 in FIG. 1) that stores identification information indicative of the GPS satellite from which the navigation data was received, in corresponding relationship to correction time data;

an internal current-time determining unit (for example, 11 in FIG. 1; step S33 in FIG. 9; step S53 in FIG. 10) that acquires internal current-time data from the timekeeping unit and determines whether the acquired internal time data matches the corrected time data stored in the storage;

a GPS satellite selector (for example, 11 in FIG. 1; step S1 in FIG. 8; step S34 in FIG. 9, step S55 in FIG. 10), responsive to the determining that the acquired internal current time data matches, for selecting a GPS satellite represented by the identification information stored in the storage in corresponding relationship to the correction time data;

an acquiring unit (for example, 11 in FIG. 1; step S3 in FIG. 8; step S37 in FIG. 9, step S58 in FIG. 10) that causes the reception unit to receive the navigation data from the GPS satellite selected by the GPS satellite selector, and for acquiring GPS time data included in the navigation data;

a correction unit (for example, 11 in FIG. 1; steps S4, S5 in FIG. 8; step S38, S39 in FIG. 9, step S59, S60 in FIG. 10) that corrects the internal time data based on the GPS time data acquired by the acquiring unit; and a storage control unit (for example, 11 in FIG. 1; step S40 in FIG. 9, step S61 in FIG. 10) that stores in the storage identification information indicative of the GPS satellite, from which the navigation data was received by the reception unit, in correspondence to the correction time data.

Since one GPS satellite is selected and its GPS time data is received, the power consumed to correct the internal current time using the GPS signal is reduced. In addition, at the time of time correction the same GPS satellite from which the navigation data was received successfully in the previous time correction is selected and the time data of that satellite is used for the internal current-time correction. Thus, high accuracy time correction is achieved.

(2) The timepiece of item (1), wherein the correction time data involves predetermined time data; and the internal current time determining unit automatically determines whether the acquired internal current time data matches the correction time data stored in the storage.

Since the same GPS satellite from which the navigation data was received successfully in the previous time correction is selected automatically at a predetermined time and HOW data of the GPS signal is received. Thus, the internal current-time correction is achieved easily with the HOW data.

(3) The timepiece of item (1) further comprising an operation unit (for example, 12 in FIG. 1; step S51 in FIG. 10) by which a time correction command is given to the timepiece; and wherein:

the internal time determining unit is responsive to a time correction command given by the operation unit to acquire internal current-time data from the timekeeping unit and determines whether the acquired internal time data matches the correction time data stored in the storage.

Since the same GPS satellite from which the navigation data was received successfully in the previous time correction is selected at a time when a correction command is given and the time data of that satellite is received and used to correct the internal current time. Thus, this correction is achieved with high accuracy.

(4) The timepiece of item (3), further comprising a predetermined period determining unit (for example, 11 in FIG. 1; step S54 in FIG. 10) that determines whether the internal current time is within a predetermined period of time after a correction time indicated by the correction time data stored in the storage; and wherein:

the internal time determining unit is responsive to the determining that the internal time is within the predetermined period of time after a correction time to determine whether the internal time data matches the correction time data.

When the internal current time is within a predetermined period of time after the correction time, the GPS satellite which hardly deviates from its position where the navigation and GPS time data was received in the previous time correction is selected at the same time as the navigation and GPS time data was acquired in the previous time correction and used to correct the internal current time. Thus, the correction is achieved with high accuracy.

(5) The timepiece of item (1), wherein the internal time correction unit calculates correcting data based on an intercalary second, the GPS time data acquired by the acquiring unit, the distance between the timepiece and the GPS satellite from which the navigation data was received by the reception unit, and a time required from the acquisition of the GPS signal to correction of the internal current time data, and then corrects the internal current time data with the correcting data.

Thus, the internal current-time correction can be achieved with high accuracy based on the internal processing time, an intercalary second, the GPS time data and the distance between the GPS satellite and the timepiece.

(6) A time correction method comprising the steps of:

acquiring internal current-time data provided by a timekeeping unit, and determining whether the acquired internal time data matches correction time data stored in storage in correspondence to satellite identification data indicative of a GPS satellite from which the GPS signal including navigation data was received (for example, step S3 in FIG. 8; step S53 in FIG. 10);

responsive to the determining that the acquired internal time data matches, selecting a GPS satellite represented by the identification information stored in the storage in corresponding relationship to the correction time data (for example, step S1 in FIG. 8; step S34 in FIG. 9, step S55 in FIG. 10);

receiving the navigation data from the selected GPS satellite, and acquiring GPS time data included in the navigation data (for example, step S3 in FIG. 8; step S37 in FIG. 9, step S58 in FIG. 10);

correcting the internal time data based on the acquired GPS time data (for example, steps S4, S5 in FIG. 8; steps S38, S39 in FIG. 9, steps S59, S60 in FIG. 10); and storing in the storage identification information indicative of the GPS satellite, from which the navigation data was received, in correspondence to the correction time data (for example, step S40 in FIG. 9; step S61 in FIG. 10).

Since one GPS satellite is selected and its GPS time data is received, the power consumed to correct the internal current time using the GPS signal is reduced. In addition, at the time of time correction the same GPS satellite from which the navigation data was received successfully in the previous time correction is selected and the time data of that satellite is used for the internal current-time correction. Thus, high accuracy time correction is achieved.

(7) The method of item (6), wherein the corrected time data involves predetermined time data; and the determining step automatically determines whether the acquired internal time data matches correction time data stored in the storage.

Since the same GPS satellite from which the navigation data was received successfully in the previous time correction is selected automatically at a predetermined time and HOW data of the GPS signal is received. Thus, the internal current-time correction is achieved easily with the HOW data.

(8) The method of item (6) further comprising the step of giving a time correction command (for example, step S51 in FIG. 10); and wherein:

the determining step is responsive to the given time correction command to acquire internal current-time data from the timekeeping unit to determine whether the acquired internal current time data matches correction time data stored in the storage.

Since the same GPS satellite from which the navigation data was received successfully in the previous time correction is selected at a time when a correction command is given and the time data of that satellite is received and used to correct the internal current time. Thus, this correction is achieved with high accuracy.

(9) The method of item (8), further comprising the step of determining whether the internal current time is within a predetermined period of time after a correction time indicated by that correction time data stored in the storage (for example, step S54 in FIG. 10); and wherein:

the last-mentioned determining step is responsive to the determining that the internal time is within the predetermined period of time after a correction time to determine whether the internal current time data matches that correction time data.

When the internal current time is within a predetermined period of time after the correction time, the GPS satellite which hardly deviates from its position where the navigation and GPS time data was received in the previous time correction is selected at the same time as the navigation and GPS time data was acquired in the previous time correction and used to correct the internal current time. Thus, the correction is achieved with high accuracy.

(10) The method of item (6), wherein the correcting step comprises calculating correcting data based on an intercalary second, the acquired GPS time data, the distance between the timepiece and the GPS satellite from which the navigation data was received, and a time required from the acquisition of the GPS signal to correction of the internal current time data, and then correcting the internal current time data with the correcting data.

The internal current-time correction can be achieved with high accuracy based on the internal processing time, an intercalary second, the GPS time data and the distance between the GPS satellite and the timepiece.

This application is based on Japanese Patent Application No. 2006-099774 filed on Mar. 31, 2006 and including specification, claims, drawings and summary. The disclosure of the above Japanese patent application is incorporated herein by reference in its entirety.

What is claimed is:

1. A timepiece comprising:
a reception unit that receives navigation data included in one of a plurality of GPS signals, each GPS signal including navigation data transmitted by a plurality of GPS satellites, respectively;
a timekeeping unit that provides a current time and holds the current time as internal current time data;
a storage unit that stores a plurality of items of identification information, each identifying a respective one the GPS satellites from which the navigation data was received, the plurality of items of identification data being stored in a corresponding relationship with a plurality of items of correction time data, respectively, each item of correction time data indicating a time when the internal current time should be corrected, and each item of correction time data being preset by a user;
internal current time determining means for acquiring the internal current time data from the timekeeping unit and determining whether the acquired internal current time data matches one of the items of correction time data stored in the storage unit;
GPS satellite selecting means for, responsive to a determination that the acquired internal current time data matches one of the items of correction time data stored in the storage unit, selecting a GPS satellite represented by the item of identification information stored in the storage unit in a corresponding relationship to said one of the items of correction time data;
acquiring means for causing the reception unit to receive the navigation data from the GPS satellite selected by the GPS satellite selecting means, and for acquiring GPS time data included in the navigation data;
correction means for correcting the internal current time data based on the GPS time data acquired by the acquiring means; and
storage control means for storing, in the storage unit, identification information indicative of the GPS satellite, from which the navigation data was received by the reception unit, in correspondence to said one of the items of correction time data.

2. The timepiece of claim 1, wherein the internal current time determining means automatically determines whether the acquired internal current time data matches one of the plurality of items of correction time data stored in the storage unit.

3. The timepiece of claim 1, further comprising an operation unit by which a time correction command is given to the timepiece;
wherein the internal current time determining means is responsive to the time correction command given by the operation unit to acquire the internal current time data from the timekeeping unit and to determine whether the acquired internal current time data matches one of the plurality of items of correction time data stored in the storage unit.

4. The timepiece of claim 3, further comprising predetermined period determining means for determining whether the internal current time is within a predetermined period of time after a correction time indicated by said one of the items of correction time data stored in the storage unit;
wherein the internal current time determining means determines, responsive to a determination that the internal current time is within the predetermined period of time after the correction time indicated by said one of the items of correction data, whether the internal current time data matches said one of the items of correction time data.

5. The timepiece of claim 1, wherein the internal current time correction means calculates correcting data based on an intercalary second, the GPS time data acquired by the acquiring means, a distance between the timepiece and the GPS satellite from which the navigation data was received by the reception unit, and a time required from acquisition of the GPS signal to correction of the internal current time data, and then corrects the internal current time data with the correcting data.

6. A time correction method comprising:
acquiring internal current time data provided by a timekeeping unit, and determining whether the acquired internal current time data matches one of a plurality of items of correction time data stored in a storage unit in correspondence to a plurality of items of satellite identification data, respectively, each item of the satellite identification data being indicative of a respective one of a plurality of GPS satellites from which a GPS signal including navigation data was received, each correction time data being preset by a user;

responsive to a determination that the acquired internal current time data matches one of the plurality of items of correction time data stored in the storage unit, selecting a GPS satellite represented by the identification data stored in the storage in a corresponding relationship to said one of the items of correction time data;

receiving the navigation data from the selected GPS satellite, and acquiring GPS time data included in the navigation data;

correcting the internal current time data based on the acquired GPS time data; and storing, in the storage unit, identification information indicative of the GPS satellite, from which the navigation data was received, in correspondence to said one of the items of correction time data.

7. The method of claim 6, wherein it is automatically determined whether the acquired internal current time data matches one of the plurality of items of correction time data stored in the storage unit.

8. The method of claim 6, further comprising giving a time correction command;

wherein the acquiring of the internal current time data from the timekeeping unit and the determining of whether the acquired internal current time data matches one of the items of correction time data stored in the storage unit are performed responsive to the time correction command.

9. The method of claim 8, further comprising determining whether the internal current time is within a predetermined period of time after a correction time indicated by said one of the items of correction time data stored in the storage unit;

wherein the determining of whether the acquired internal current time data matches said one of the items of correction time data stored in the storage unit, is performed responsive to a determination that the internal current time is within the predetermined period of time after said one of the items of correction time.

10. The method of claim 6, wherein correcting the internal current time data comprises calculating correcting data based on an intercalary second, the acquired GPS time data, a distance between the timepiece and the GPS satellite from which the navigation data was received, and a time required from acquisition of the GPS signal to correction of the internal current time data, and then correcting the internal current time data with the correcting data.

* * * * *